C. C. STAMBAUGH.
MILK PASTEURIZER AND FILTER.
APPLICATION FILED MAY 14, 1909.
939,107.
Patented Nov. 2, 1909.
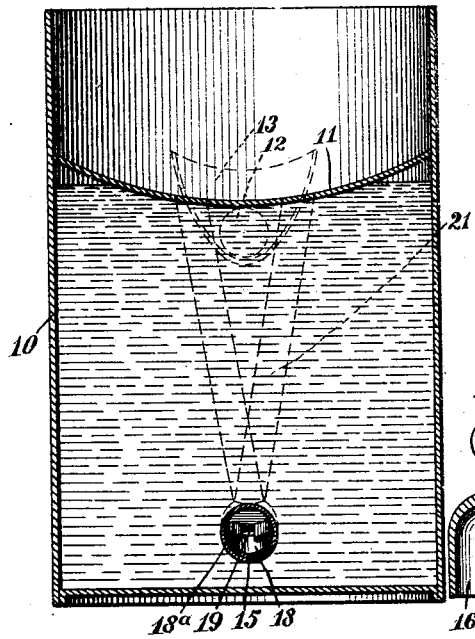
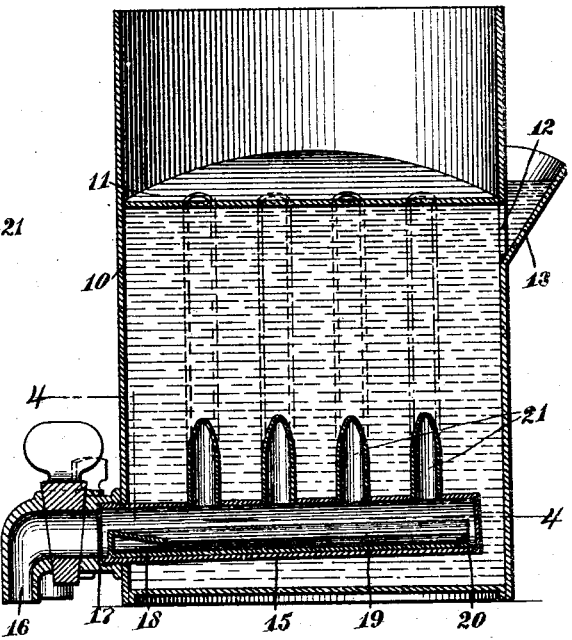
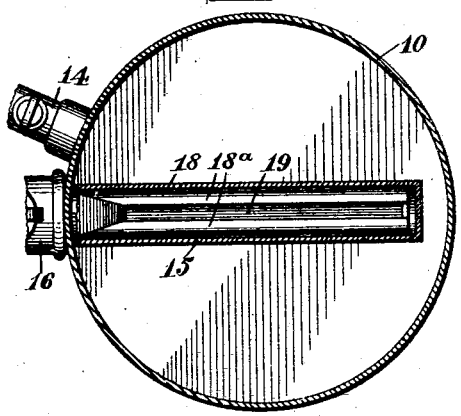
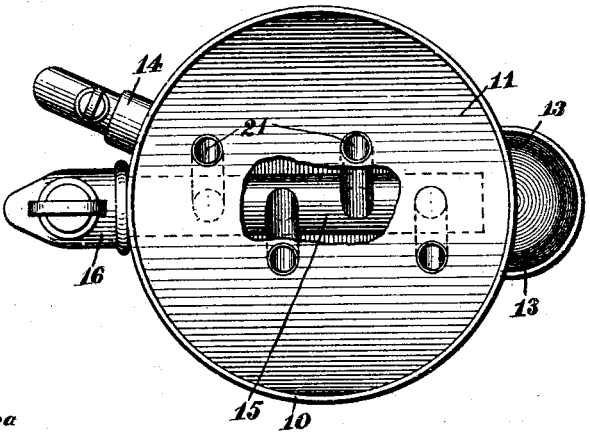
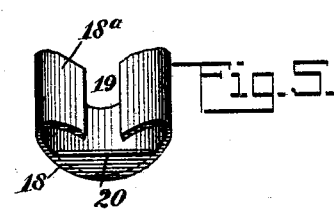
WITNESSES
INVENTOR
Charles C. Stambaugh
BY
Munn & Co
ATTORNEYS

UNITED STATES PATENT OFFICE.

CHARLES C. STAMBAUGH, OF NEW YORK, N. Y.

MILK PASTEURIZER AND FILTER.

939,107.   Specification of Letters Patent.   Patented Nov. 2, 1909.

Application filed May 14, 1909. Serial No. 496,008.

*To all whom it may concern:*

Be it known that I, CHARLES C. STAMBAUGH, a citizen of the United States, and a resident of the city of New York, borough of the Bronx, in the county and State of New York, have invented a new and Improved Milk Pasteurizer and Filter, of which the following is a full, clear, and exact description.

The invention has in view a simple apparatus for the pasteurization and filtration of milk, the pasteurizing and filtering being successively and continuously performed by passing the milk through a pail or vessel having my improvements.

To this end the apparatus in general consists of a pail having a depressed head dividing it into an upper milk compartment and a lower hot water compartment, a tubular filtering chamber approximately horizontally arranged in the hot water compartment near the bottom of the pail and provided with a controlling valve at the outside of the pail, a filtering trough removably seated in the tubular chamber and having inwardly and downwardly-inclined flanges at the top, the edges of the flanges being separated sufficiently to provide a relatively narrow slot, and flues in which the milk is pasteurized, leading from the depressed head to the tubular chamber over the slot of the filtering trough.

Reference is to be had to the accompanying drawings forming a part of this specification, in which similar characters of reference indicate corresponding parts in all the views.

Figure 1 is a central vertical section through a combined pasteurizer and filter embodying my invention; Fig. 2 is a similar section at right-angles to the section shown in Fig. 1; Fig. 3 is a plan of the apparatus, showing the depressed head partly broken away to illustrate the connection between the pasteurizing flues and tubular chamber; Fig. 4 is a section substantially on the line 4—4 of Fig. 1; and Fig. 5 is a perspective view of a fragment of the filtering trough.

More specifically described, the invention embodies in its construction a pail or vessel 10 which has a depressed dished head 11 dividing the pail into two compartments, an upper milk compartment and a lower hot water compartment, the latter having an inlet opening 12 for the introduction of the water, which is located at the top of the water compartment and provided with a surrounding spout 13 at one side of the pail. For the discharge of the water, a valve-controlled outlet 14 is in connection with the pail near the bottom. In the water compartment near the bottom of the pail is a tubular filtering chamber 15 approximately horizontally arranged or slightly downwardly and outwardly inclined, and at the outside of the pail has a controlling valve 16, which, as shown in Fig. 1, is threaded onto the outer end of the chamber and binds a strainer 17 thereto. Removably seated in the tubular chamber 15 is a filtering trough 18 having downwardly and inwardly-inclined flanges $18^a$, with the edges of the flanges separated sufficiently to provide between them a relatively narrow slot 19. The inner end of the filtering trough is closed at the lower portion by a wall 20, and the outer end is fully closed and provided with an inwardly-extending flange corresponding to the side flanges $18^a$, as shown in Fig. 1. A number of pasteurizing flues 21 lead from the depressed head 11 to the tubular chamber 15 over the slot of the filtering trough.

In treating the milk, the apparatus is assembled as shown in Fig. 1. Hot water is then poured into the lower compartment of the pail through the spout 13, and the milk poured into the upper compartment of the pail, from which it passes through the flues 21 into the filtering chamber and is drawn off through the valve or spigot 16. As the milk flows through the flues it is pasteurized, and such particles of foreign matter as the milk may contain, drop on the filtering trough 20, and by reason of the downwardly and inwardly-inclined flanges of this device these particles pass into the trough through the slot, where they remain. Any particle which is lighter than the milk, or which escapes the filtering trough, is caught by the screen 17 as the milk flows out. During the treatment of the milk, the water in the hot water compartment is maintained at the required temperature by pouring additional hot water into the spout 13 while the cooled water runs out through the spigot or valve 14. To clean the apparatus, the spigot 16 is removed, which releases the strainer 17, leaving the filtering trough accessible at the outer end of the filtering tube. The trough is then withdrawn, when the sediment may be easily washed out, and it and the remaining parts readily cleansed.

Having thus described my invention, I claim as new and desire to secure by Letters Patent:

1. In a combined pasteurizer and filter, a pail having a depressed head dividing it into an upper milk compartment and a lower hot water compartment, a tubular filtering chamber arranged in the hot water compartment near the bottom of the pail, a filtering trough seated in the chamber, having inwardly and downwardly-inclined flanges at opposite sides, with the edges of the flanges separated to provide a slot for the passage of foreign particles in the milk into the trough, and pasteurizing flues leading from the head to the filtering chamber over the slot in the trough.

2. In a combined pasteurizer and filter, a pail having a depressed head dividing it into an upper milk compartment and a lower hot water compartment, a filtering chamber arranged in the hot water compartment near the bottom of the pail, and pasteurizing flues leading from the head to the filtering chamber.

3. In a combined pasteurizer and filter, a pail having a depressed head dividing it into an upper milk compartment and a lower hot water compartment, the hot water compartment having an inlet opening at the top provided with a surrounding spout at one side of the pail, the said water compartment also having a valve-controlled outlet leading from a point near the bottom of the pail, a tubular filtering chamber arranged in the hot water compartment near the bottom of the pail, having a controlling valve at the outside of the pail, a filtering trough seated in the filtering compartment having a slot in the top, and pasteurizing flues leading from the head to the filtering chamber and discharging over the slot in the trough.

4. The combination of a milk compartment, a hot water compartment, a filtering chamber, a filtering trough seated in the chamber, and pasteurizing flues leading from the milk compartment through the hot water compartment and discharging into the filtering compartment over the filtering trough.

5. The combination of a milk compartment, a hot water compartment, a tubular filtering chamber arranged in the water compartment near the bottom thereof, a spigot arranged at the outside of the hot water compartment and removably applied to the filtering chamber, a strainer arranged between the spigot and chamber, a filtering trough seated in the chamber and removable through the end thereof when the spigot is removed, and pasteurizing flues leading from the milk compartment to the chamber and discharging over the filtering trough.

In testimony whereof I have signed my name to this specification in the presence of two subscribing witnesses.

CHARLES C. STAMBAUGH.

Witnesses:
W. W. HOLT,
PHILIP D. ROLLHAUS.